(12) United States Patent
Sako

(10) Patent No.: US 10,560,590 B2
(45) Date of Patent: Feb. 11, 2020

(54) INFORMATION PROCESSING APPARATUS EQUIPPED WITH COMMUNICATION FUNCTIONS, CONTROL METHOD THEREFOR, AND STORAGE MEDIUM

(71) Applicant: CANON KABUSHIKI KAISHA, Tokyo (JP)

(72) Inventor: Ritsuto Sako, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/171,865

(22) Filed: Oct. 26, 2018

(65) Prior Publication Data

US 2019/0132457 A1 May 2, 2019

(30) Foreign Application Priority Data

Nov. 2, 2017 (JP) ................................ 2017-212907

(51) Int. Cl.
*G06F 3/12* (2006.01)
*H04N 1/00* (2006.01)

(52) U.S. Cl.
CPC ....... *H04N 1/00244* (2013.01); *G06F 3/1209* (2013.01); *G06F 3/1236* (2013.01); *G06F 3/1272* (2013.01); *G06F 3/1287* (2013.01); *H04N 1/001* (2013.01); *H04N 1/00312* (2013.01); *H04N 1/00493* (2013.01)

(58) Field of Classification Search
USPC ........................................................ 358/1.15
See application file for complete search history.

(56) References Cited

U.S. PATENT DOCUMENTS

| 10,194,003 B2* | 1/2019 | Imai .......................... G06F 3/00 |
| 2013/0016627 A1* | 1/2013 | Higashihara ............ H04L 43/10 370/254 |
| 2016/0277621 A1* | 9/2016 | Iida .................... H04N 1/00973 |

FOREIGN PATENT DOCUMENTS

| JP | 2003319461 A | 11/2003 |
| JP | 2013207541 A | 10/2013 |

OTHER PUBLICATIONS

Satoshi, Communication Device, Jul. 10, 2013, Machine Translated Japanese Patent Application Publication, JP 2013-207541 Listed on IDS, All Pages (Year: 2013).*

* cited by examiner

*Primary Examiner* — Henok Shiferaw
(74) *Attorney, Agent, or Firm* — Rossi, Kimms & McDowell LLP

(57) ABSTRACT

An information processing apparatus which is capable of preventing communications with a desired external apparatus from becoming impossible due to settings on a proxy server. The proxy server is used to carry out communications on a main line with an external apparatus connected to the information processing apparatus via the Internet. On a sub line, communications are carried out with an external apparatus connected to the information processing apparatus via a local network. The main line or the sub line is selected as a line to be used. Communications with the external apparatus connected to the line to be used are carried out via the proxy server. When the line to be used is the sub line, communications are carried out directly with the external apparatus, which is connected to the line to be used, without using the proxy server.

9 Claims, 10 Drawing Sheets

INFORMATION PROCESSING APPARATUS EQUIPPED WITH COMMUNICATION FUNCTIONS, CONTROL METHOD THEREFOR, AND STORAGE MEDIUM

BACKGROUND OF THE INVENTION

Field of the Invention

The present invention relates to an information processing apparatus, a control method therefor, and a storage medium.

Description of the Related Art

An MFP which is an information processing apparatus equipped with communication functions is known. The MFP has a plurality of communication devices for implementing the communication functions, such as a wired LAN (local area network) device which carries out wired LAN communications and a wireless LAN device which carries out wireless LAN communications (see, for example, Japanese Laid-Open Patent Publication No. 2003-319461). Lately, from the standpoint of security and others, there has been an increasing demand for MFPs capable of using networks in accordance with intended uses, and MFPs using different communication devices for respective networks are under development. Such MFPs are equipped with a plurality of communication lines such as a main line and a sub line. For example, communications using an external apparatus and a wired LAN device, which are connected to one network, are carried out on the main line. Communications using an external apparatus and a wireless LAN device, which are connected to the other network different from the above network, are carried out on the sub line. The main line supports communications using the Internet, whereas the sub line does not support communications using the Internet but only supports communications using a local network. When an external apparatus which is a communication destination is designated, the MFP equipped with the main line and the sub line (hereafter referred to as "the multiline MFP") determines which one of the main line and the sub line is to be used and carries out communications with the external apparatus on the selected line (see, for example, Japanese Laid-Open Patent Publication No. 2013-207541).

The multiline MFP uses a proxy server, which is configured in advance, when carrying out communications via the Internet. In a case where, for example, a proxy server on the main line is configured, the multiline MFP accesses this proxy server when starting communication with an external apparatus designated as a communication destination. By using this proxy server, the multiline MFP is able to carry out communications on the main line with the connected external apparatus via the Internet.

In the above described multiline MFP, however, there may be a case where communication with a desired external apparatus is impossible when the proxy server on the main line is configured. For example, even when an external apparatus on the sub line is designated as a communication destination, the multiline MFP tries to access the configured proxy server on the main line when starting communication with the external apparatus. Since the proxy server does not exist on the sub line, an access error occurs in the multiline MFP, and as a result, the multiline MFP cannot carry out communications with the external apparatus. Namely, the conventional MFPs have the problem that communication with a desired external apparatus becomes impossible due to settings on a proxy server.

SUMMARY OF THE INVENTION

The present invention provides an information processing apparatus and a control method therefor which are capable of preventing communication with a desired external apparatus from becoming impossible due to settings on a proxy server, as well as a storage medium.

Accordingly, the present invention provides an information processing apparatus equipped with a first line on which communications are carried out with an external apparatus connected to the information processing apparatus via the Internet and a second line on which communications are carried out with an external apparatus connected to the information processing apparatus via a local network, comprising a setting unit configured to makes settings on a proxy server that is used to carry out communications with the external apparatus connected to the information processing apparatus via the Internet, a line selection unit configured to select one of the first line and the second line as a line to be used, and a communication unit configured to carry out communications with the external apparatus, which is connected to the line to be used, via the proxy server, wherein in a case where the line to be used is the second line, the communication unit carries out communications directly with the external apparatus, which is connected to the line to be used, without using the proxy server.

According to the present invention, communication with a desired external apparatus is prevented from becoming impossible due to settings on a proxy server.

Further features of the present invention will become apparent from the following description of exemplary embodiments (with reference to the attached drawings).

DESCRIPTION OF THE EMBODIMENTS

An embodiment of the present invention will now be described in detail with reference to the accompanying drawings. In the following description of the present embodiment, the present invention is applied to an MFP which is an information processing apparatus, but the present invention should not always be applied to the MFP but may be applied to, for example, a PC equipped with a plurality of communication lines to which different IP addresses are assigned.

Figure 1:
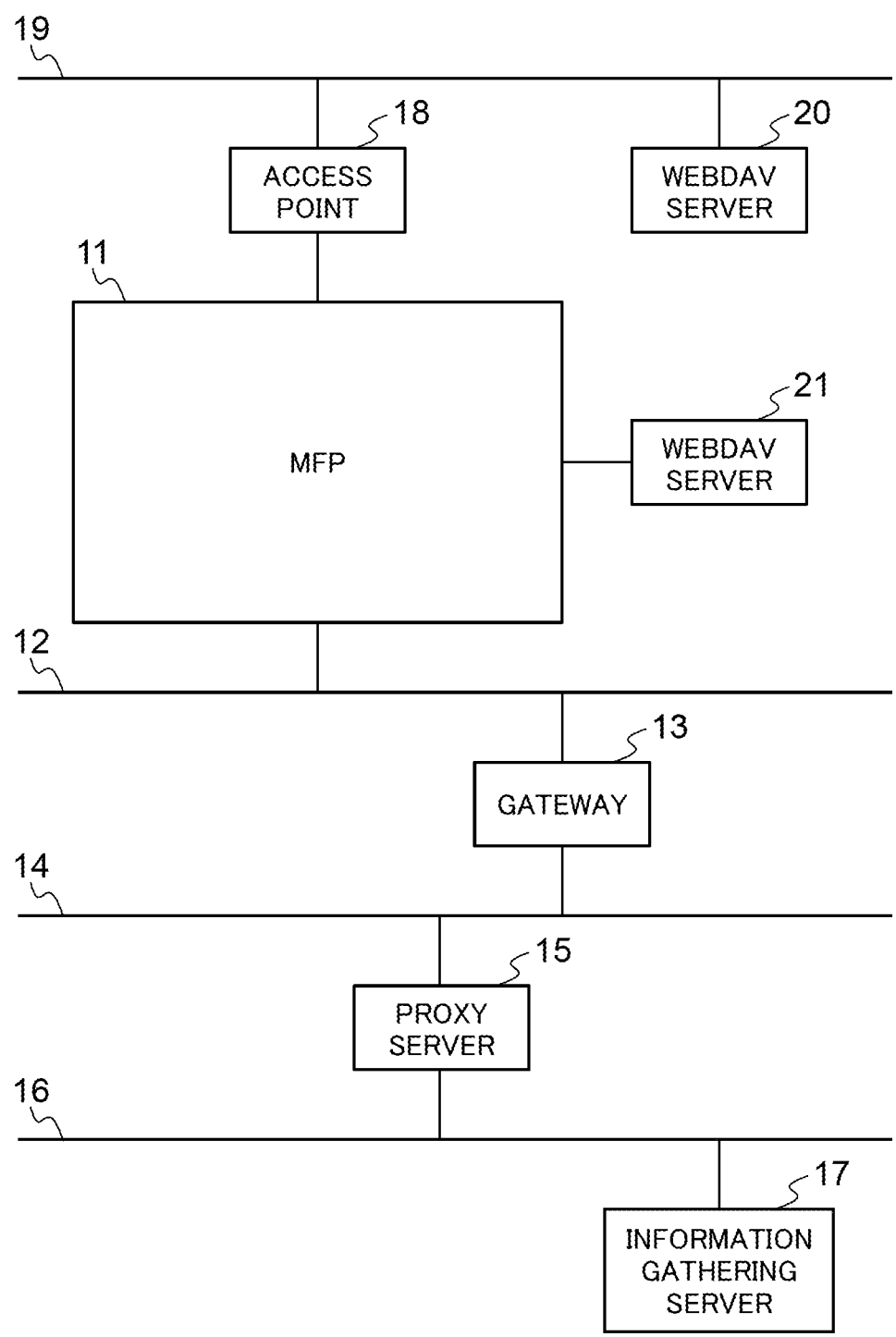
FIG. 1 is a diagram useful in explaining a network arrangement of an MFP which is an information processing apparatus according to an embodiment of the present invention.

FIG. 1 is a diagram useful in explaining a network arrangement of an MFP 11 which is an information processing apparatus according to an embodiment of the present invention.

Referring to FIG. 1, the MFP 11 is connected to a LAN 12 via a wired cable, not shown. The LAN 12 is connected to a LAN 14 via a gateway 13. The LAN 14 is connected to the Internet 16 via a proxy server 15. The MFP 11 carries out wired LAN communications with an external apparatus, which is connected to the MFP 11 via the Internet 16, such as an information gathering server 17 by means of a wired LAN device 212 in FIG. 2, to be described later.

The MFP 11 is connected to a LAN 19 via an access point 18 through a wireless LAN connection. The MFP 11 carries out wireless LAN communications with an external apparatus, which is connected to the LAN 19, such as a WebDAV server 20 by means of a wireless LAN device 214 in FIG. 2, to be described later. Furthermore, the MFP 11 carries out wireless communications directly with an external apparatus, which is connected to the MFP 11 through a direct wireless connection, such as a WebDAV server 21 by means of the wireless LAN device 214, to be described later, without using an access point. Thus, the MFP 11 is connected to the external apparatuses via the Internet 16 and also connected to the external apparatus via the local network.

The MFP 11 has a single line mode and a multiline mode as communication functions. In the single line mode, the MFP 11 uses only a communication device selected by a user, that is, one of the wired LAN device 212 and the wireless LAN device 214, to be described later. In the multiline mode, the MFP 11 uses both the wired LAN device 212 and the wireless LAN device 214, to be described later. The MFP 11 uses one of the wired LAN device 212 and the wireless LAN device 214 for communication on a main line and uses the other one for communication on a sub line.

Figure 2:
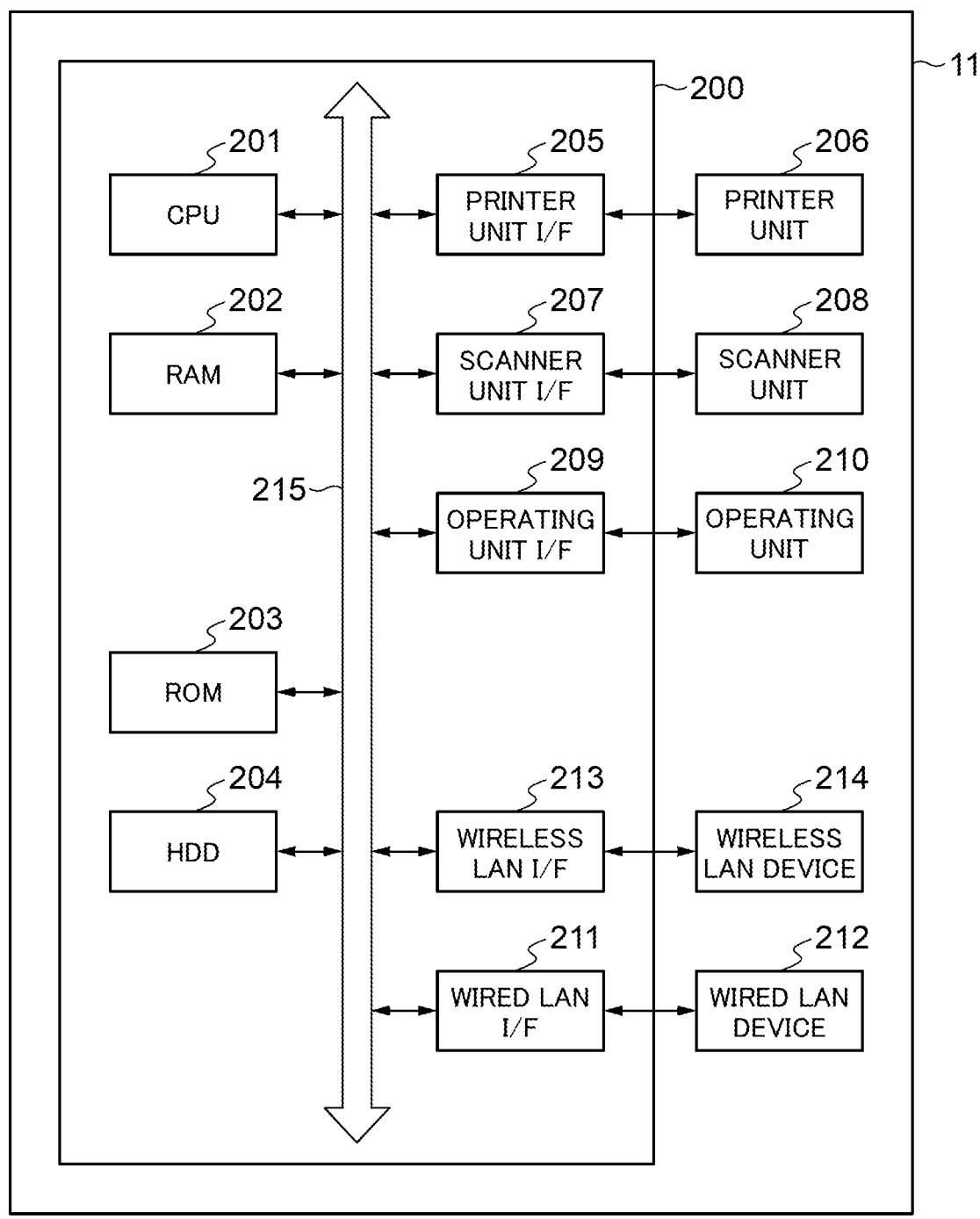
FIG. 2 is a block diagram schematically showing a hardware arrangement of the MFP in FIG. 1.

FIG. 2 is a block diagram schematically showing a hardware arrangement of the MFP 11 in FIG. 1.

Referring to FIG. 2, the MFP 11 has a control unit 200, a printer unit 206, a scanner unit 208, an operating unit 210, the wired LAN device 212, and the wireless LAN device 214. The control unit 200 is connected to the printer unit 206, the scanner unit 208, the operating unit 210, the wired LAN device 212, and the wireless LAN device 214. The control unit 200 also has a CPU 201, a RAM 202, a ROM 203, an HDD 204, a printer unit I/F 205, a scanner unit IF 207, an operating unit I/F 209, a wired LAN I/F 211, and a wireless LAN I/F 213. The CPU 201, the RAM 202, the ROM 203, the HDD 204, the printer unit I/F 205, the scanner unit I/F 207, the operating unit I/F 209, the wired LAN I/F 211, and the wireless LAN I/F 213 are connected to one another via a system bus 215.

The control unit 200 integratedly controls the entire MFP 11. The CPU 201 reads out programs stored in the ROM 203 into the RAM 202. The CPU 201 executes the read-out programs to implement processes of software modules 400 in FIG. 4, to be described later. The RAM 202 is used as a work area for the CPU 201 and also used as a temporary storage area for each piece of data. The ROM 203 stores, for example, programs to be executed by the CPU 201. The HDD 204 stores print data, scanned images, and so forth. The printer unit I/F 205 connects the printer unit 206 and the system bus 215 together. The printer unit 206 performs printing on sheets based on print data received from the external apparatuses, scanned images generated by the scanner unit 208, and so forth. The scanner unit IF 207 connects the scanner unit 208 and the system bus 215 together. The scanner unit 208 reads information off an original placed on an original platen glass (not shown) and generates a scanned image based on the read information. The scanned image generated by the scanner unit 208 is stored in the HDD 204.

Figure 3:
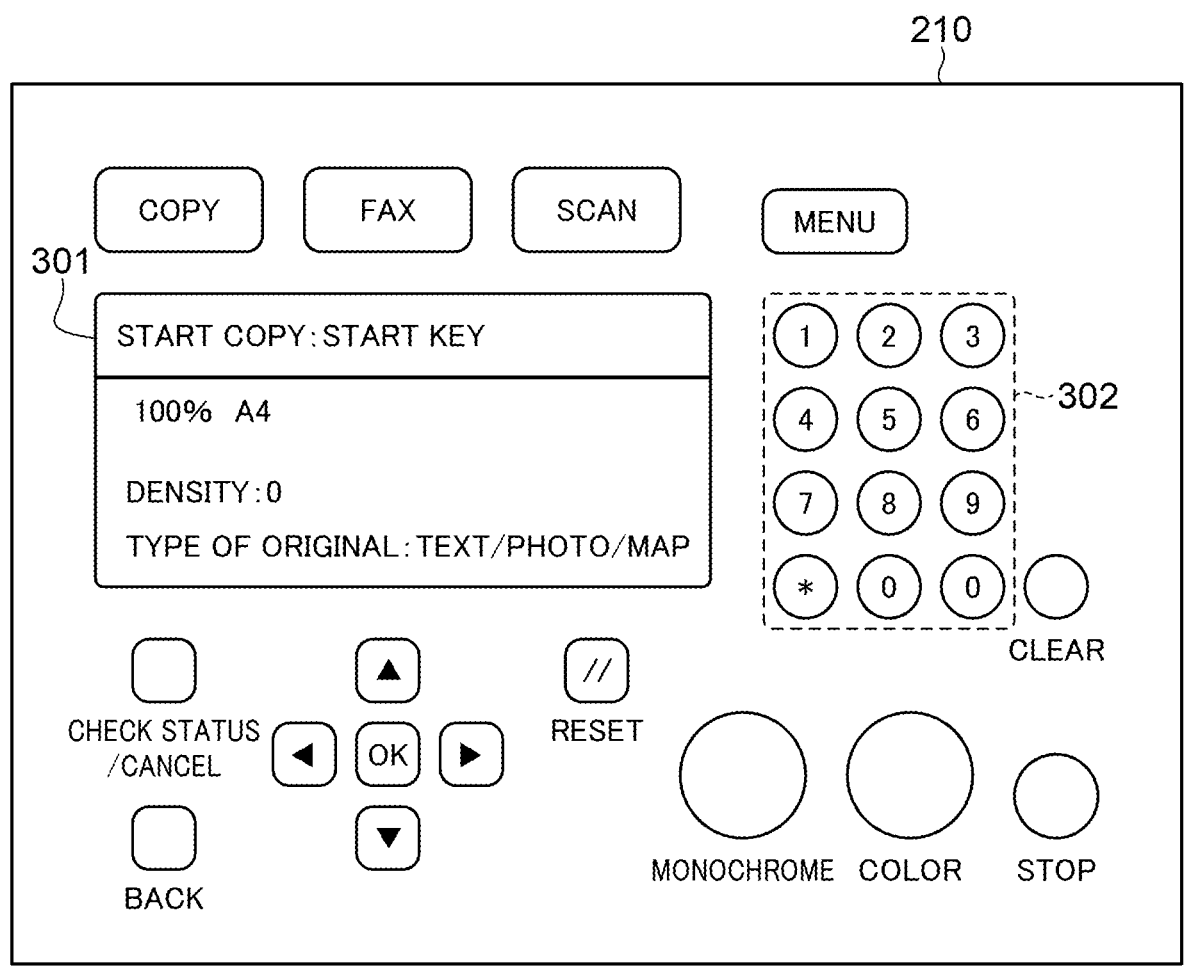
FIG. 3 is an external view of an operating unit in FIG. 2.

The operating unit I/F 209 connects the operating unit 210 and the system bus 215 together. As shown in FIG. 3, the operating unit 210 has a display unit 301 equipped with a touch panel function. The operating unit 210 also has a plurality of operating keys including a numeric keypad 302. The display unit 301 displays setting screens for configuring settings on the MFP 11, for example, a communication device setting screen 500 in FIG. 5, to be described later. The user operates the operating unit 210 to issue instructions to the MFP 11 and input setting information. The wired LAN IF 211 connects the wired LAN device 212 and the system bus 215 together. The wired LAN device 212 is a communication device for carrying out wired LAN communications. The wired LAN device 212 carries out wired LAN communications with an external apparatus connected thereto via the LAN 12. The wireless LAN I/F 213 connects the wireless LAN device 214 and the system bus 215 together. The wireless LAN device 214 is a communication device for carrying out wireless LAN communications. The wireless LAN device 214 has a wireless infrastructure mode and a wireless access point mode. In the wireless infrastructure mode, the MFP 11 carries out wireless LAN communications with the WebDAV server 20 or the like, which is connected to the LAN 19, via the access point 18. In the wireless access point mode, the MFP 11 acts as an access point to carry out wireless LAN communications directly with the WebDAV server 21 or the like.

Figure 4:
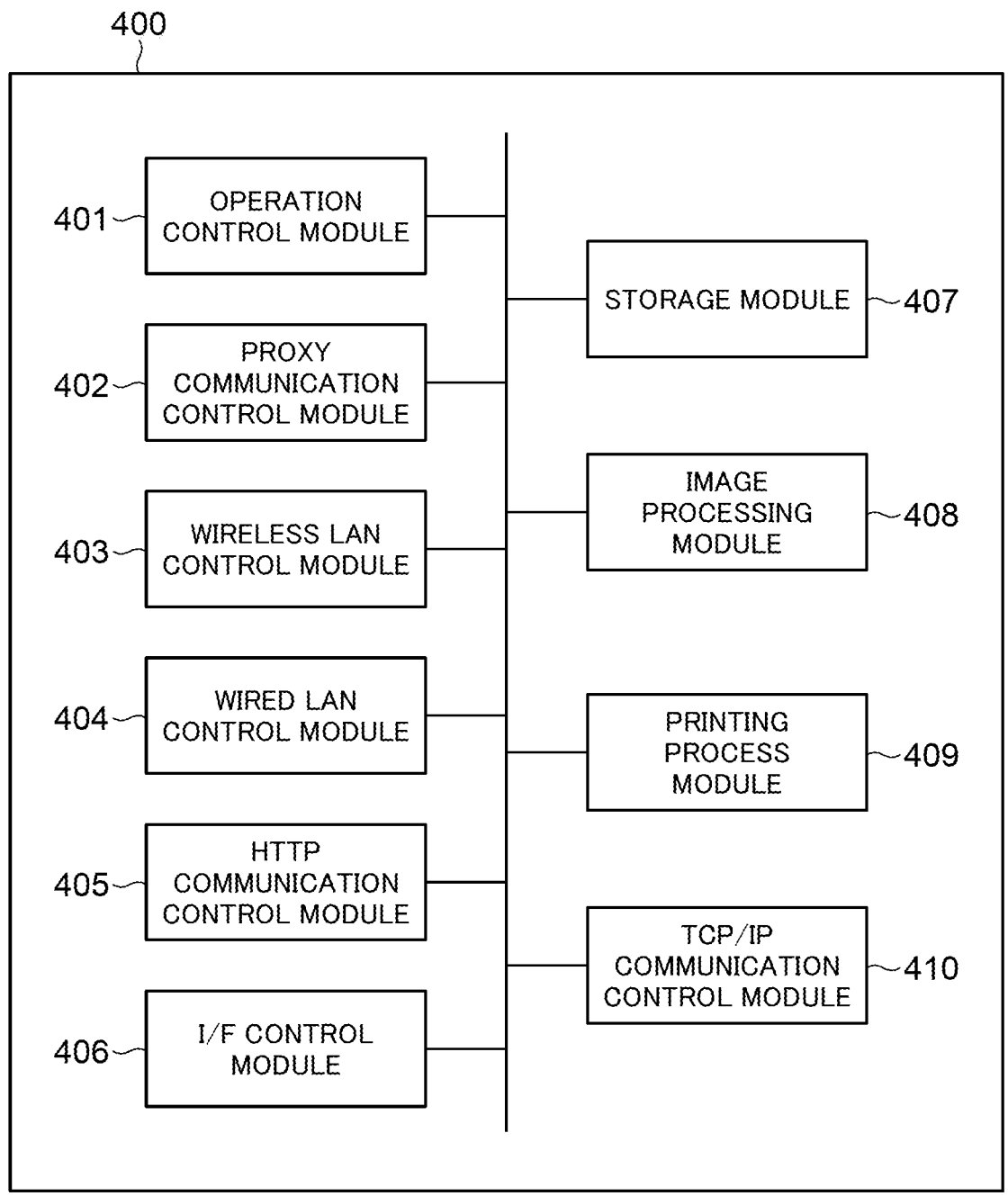
FIG. 4 is a block diagram schematically showing an arrangement of software modules of the MFP in FIG. 1.

FIG. 4 is a block diagram schematically showing an arrangement of the software modules 400 of the MFP 11 in FIG. 1.

Referring to FIG. 4, the software modules 400 are comprised of an operation control module 401, a proxy communication control module 402, a wireless LAN control module 403, a wired LAN control module 404, an HTTP communication control module 405, an I/F control module 406, a storage module 407, an image processing module 408, a printing process module 409, and a TCP/IP communication control module 410. Processes of the software modules 400 are implemented by the CPU 201 executing programs stored in the ROM 203.

The operation control module 401 controls the operating unit 210. For example, the operation control module 401 causes the operating unit 210 to display the communication device setting screen 500, to be described later. The operation control module 401 also notifies the other modules of instructions received from the user via the operating unit 210. The proxy communication control module 402 controls communications when the MFP 11 carries out communications with the proxy server 15. The wireless LAN control module 403 provides control associated with wireless LAN communications including connection and disconnection to and from the external apparatuses. The wired LAN control module 404 provides control associated with wired LAN communications including connection and disconnection to and from the external apparatuses. The HTTP communication control module 405 controls HTTP communications carried out between a browser of the MFP 11 and the WebDAV servers 20 and 21. For example, the HTTP communication control module 405 sends a scanned image generated by the scanner unit 208 to the WebDAV server 20 via HTTP. The I/F control module 406 selects one of the wired LAN device 212 and the wireless LAN device 214 as a communication device to be used. The IF control module 406 controls the selected communication device. The storage module 407 stores data designated for each module in the ROM 203 and the HDD 204. The storage module 407 also reads out the designated data from the ROM 203 and the HDD 204. The designated data is, for example, IP address information on the MFP 11 and address information on the proxy server 15. The image processing module 408 generates image data for printing by rendering print data obtained from an external apparatus or the like. The printing process module 409 converts image data rendered by the image processing module 408 into an image signal. The printing process module 409 sends the image signal to the printer unit 206 via the printer unit I/F 205. The TCP/IP communication control module 410 controls TCP/IP communications in the MFP 11.

Figure 5:
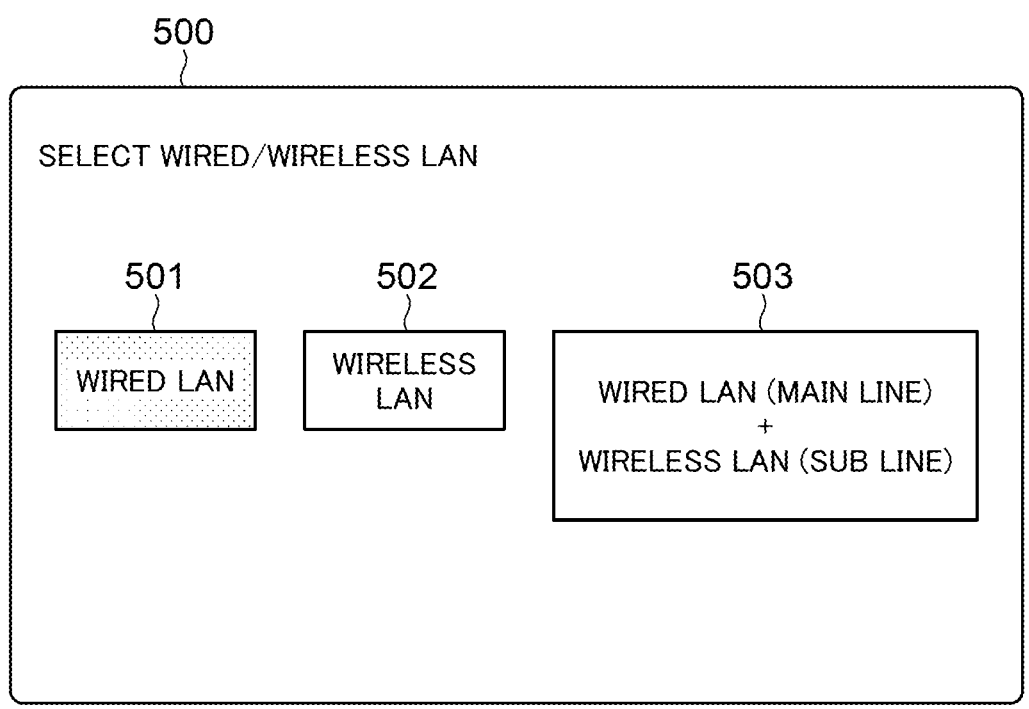
FIG. 5 is a view showing an example of a communication device setting screen which is displayed on the operating unit in FIG. 2.

A description will now be given of the communication device setting screen 500 in FIG. 5 which is displayed on the operating unit 210. The communication device setting screen 500 is a setting screen for setting a communication device to be used by the MFP 11 at the time of communication. The communication device setting screen 500 has a wired LAN button 501, a wireless LAN button 502, and a wired LAN+wireless LAN button 503. When the user selects the wired LAN button 501, the MFP 11 uses only the wired LAN device 212 of the two devices i.e. the wired LAN device 212 and the wireless LAN device 214. When the user selects the wireless LAN button 502, the MFP 11 uses only the wireless LAN device 214 of the two devices i.e. the wired LAN device 212 and the wireless LAN device 214. When the user selects the wired LAN+wireless LAN button 503, the MFP 11 uses both the wired LAN device 212 and the wireless LAN device 214. Specifically, the MFP 11 uses the wired LAN device 212 for communication over the main line and uses the wireless LAN device 214 for communication over the sub line. On the communication device setting screen 500, the user is allowed to select only one of the following three options: the wired LAN button 501, the wireless LAN button 502, and the wired LAN+wireless LAN button 503. A value indicating a button selected on the communication device setting screen 500 is stored as communication device setting information in the HDD 204.

Figure 6:
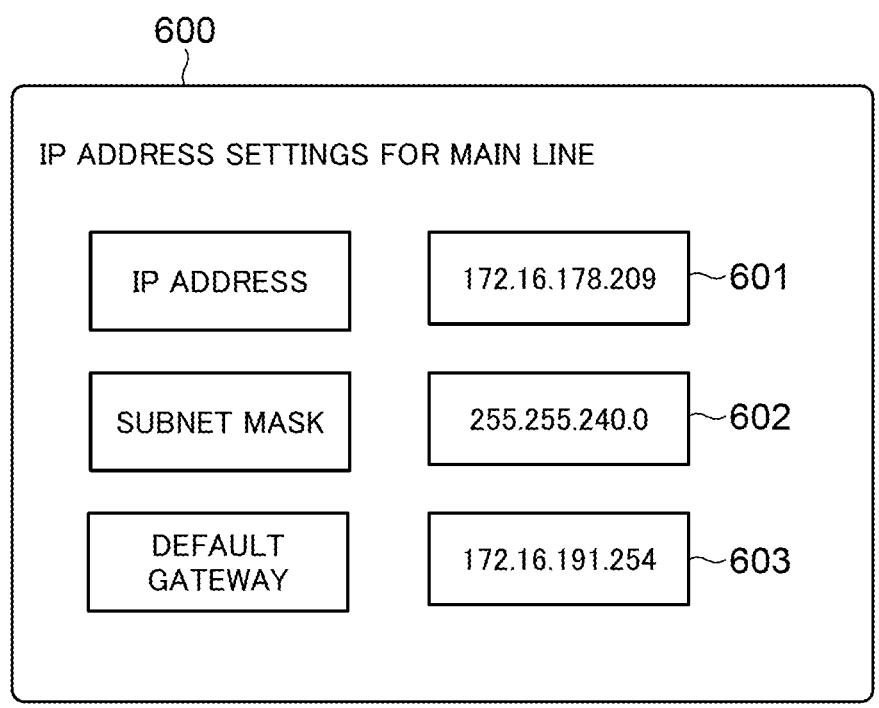
FIG. 6 is a view showing an example of a main line address setting screen which is displayed on the operating unit in FIG. 2.

FIG. 6 is a view showing an example of a main line address setting screen 600 which is displayed on the operating unit 210 in FIG. 2. The main line address setting screen 600 has setting items 601 to 603. As the setting items 601 to 603, the user sets an IP address, a subnet mask, and a default gateway of the main line in the MFP 11. The values set on the main line address setting screen 600 are stored as main line address information in the HDD 204. When the MFP 11 carries out communications on the main line, the TCP/IP communication control module 410 uses the main line address information to control the communications.

Figure 7:
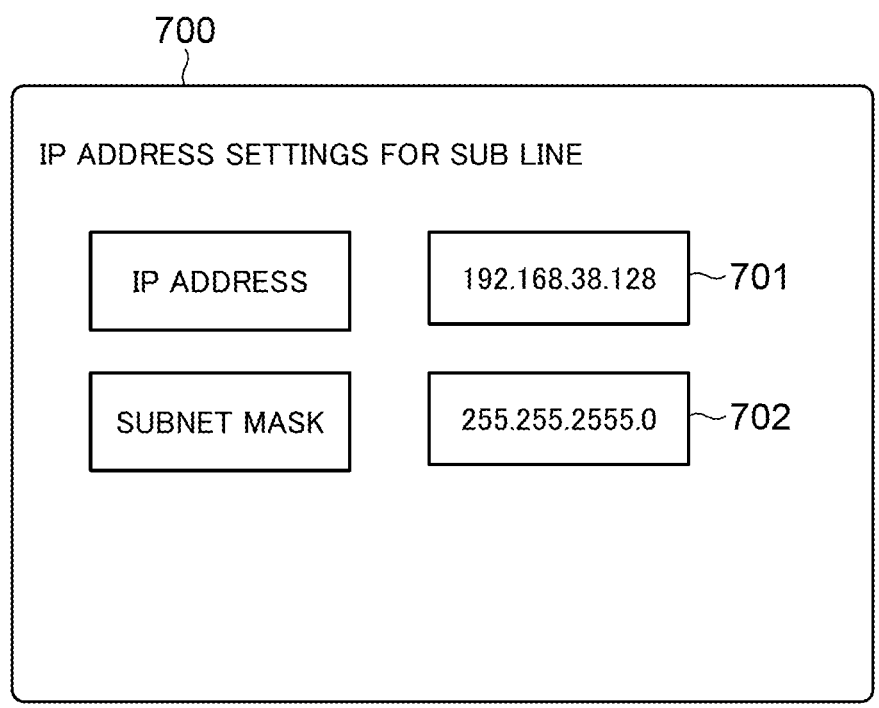
FIG. 7 is a view showing an example of a sub line address setting screen which is displayed on the operating unit in FIG. 2.

FIG. 7 is a view showing an example of a sub line address setting screen 700 which is displayed on the operating unit 210 in FIG. 2. The sub line address setting screen 700 has setting items 701 and 702. As the setting items 701 and 702, the user sets an IP address and a subnet mask of the sub line in the MFP 11. It should be noted that in the present embodiment, the sub line does not support communication via the Internet, and therefore, on the sub line address setting screen 700 there is no setting item relating to a default gateway that routes an external apparatus connected via the Internet. The values set on the sub line address setting screen 700 are stored as sub line address information in the HDD 204. When the MFP 11 carries out communications on the sub line, the TCP/IP communication control module 410 uses the sub line address information to control the communications.

Figure 8:
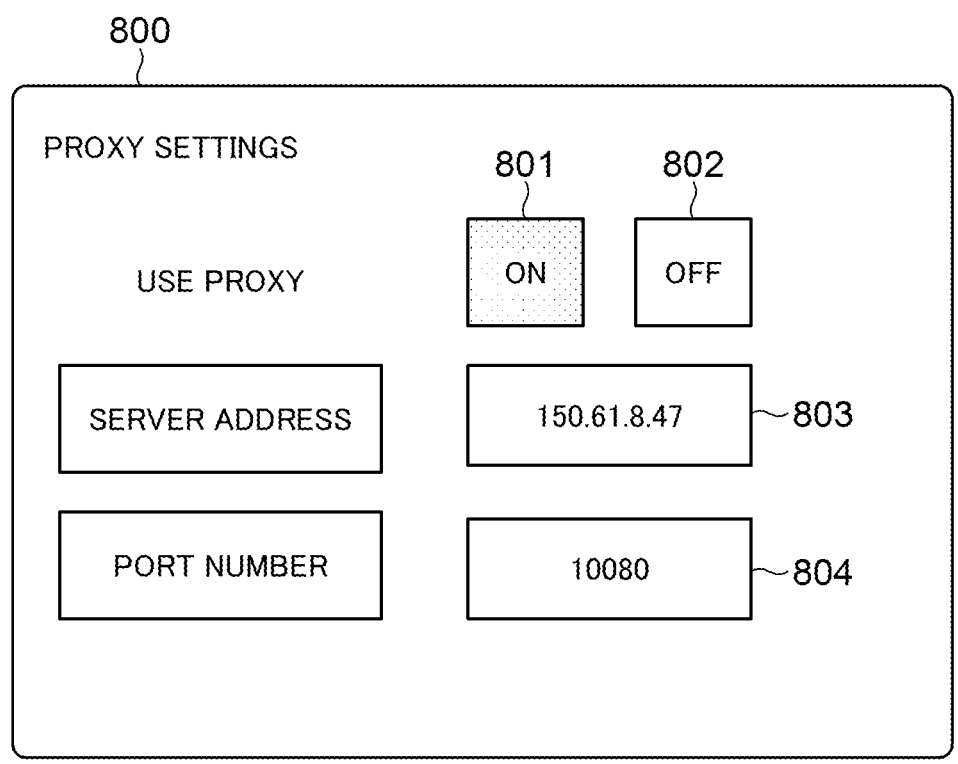
FIG. 8 is a view showing an example of a proxy setting screen which is displayed on the operating unit in FIG. 2.

FIG. 8 is a view showing an example of a proxy setting screen 800 which is displayed on the operating unit 210 in FIG. 2. The proxy setting screen 800 is a setting screen for configuring settings on the proxy server 15 which the MFP 11 uses. The proxy setting screen 800 has an ON button 801, an OFF button 802, and setting items 803 and 804. On the proxy setting screen 800, the user is allowed to select one of the ON button 801 and the OFF button 802. To use the proxy server 15 in an HTTP communication with an external apparatus, the user selects the ON button 801. When the ON button 801 is selected, "ON" indicating that settings on the proxy server 15 are enabled is stored as proxy usable/unusable information in the HDD 204. In this case, proxy address information, to be described later, is enabled, and the MFP 11 carries out the HTTP communication with the external apparatus via the proxy server 15. On the other hand, the user selects the OFF button 802 when it does not use the proxy server 15 in an HTTP communication with the external apparatus. When the OFF button 802 is selected, "OFF" indicating that the settings on the proxy server 15 are disabled is stored as proxy usable/unusable information in the HDD 204. In this case, the proxy address information, to be described later, is disabled, and the MFP 11 carries out the HTTP communication directly with the external apparatus without using the proxy server 15. As the setting items 803 and 804, the user sets an IP address and a port number of the proxy server 15. The values set as the setting items 803 and 804 are stored as the proxy address information in the HDD 204.

A description will now be given of a communication which is carried out by the MFP 11. It should be noted that in the following description of the present embodiment, the MFP 11 carries out an HTTP communication which is an example of communications.

Figure 9:
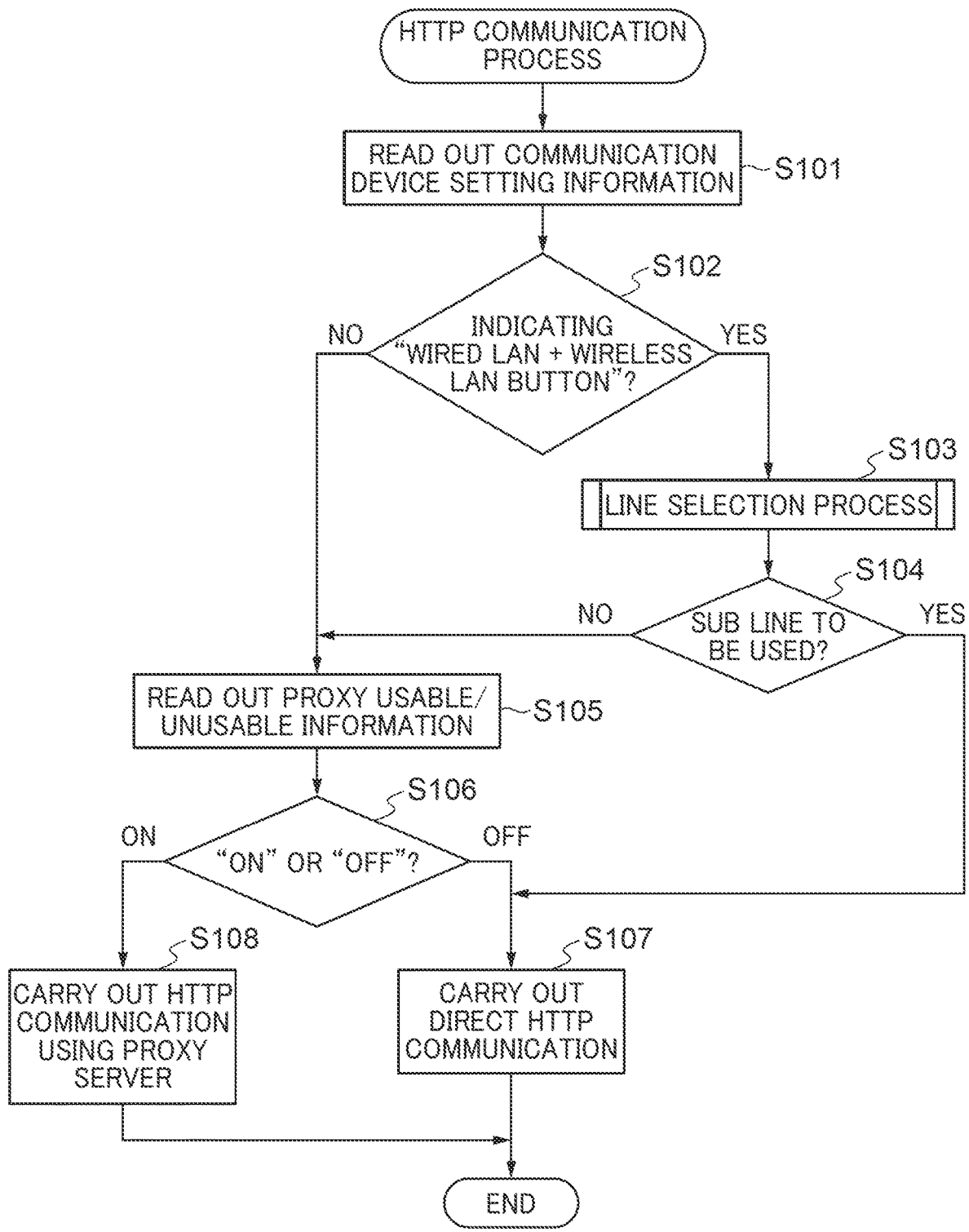
FIG. 9 is a flowchart showing the procedure of an HTTP communication process which is carried out by the MFP in FIG. 1.

FIG. 9 is a flowchart showing the procedure of an HTTP communication process which is carried out by the MFP 11 in FIG. 1.

The process in FIG. 9 is implemented by the CPU 201 executing programs stored in the ROM 203. The process in FIG. 9 is based on the assumption that the user has configured settings on the communication device setting screen 500, the main line address setting screen 600, the sub line address setting screen 700, and the proxy setting screen 800 and also designated an IP address of an external apparatus which is a communication destination.

Referring to FIG. 9, first, the CPU 201 reads out communication device setting information, which indicates an operating button selected by the user on the communication device setting screen 500, from the HDD 204 (step S101). Next, the CPU 201 determines whether or not the communication device setting information indicates "the wired LAN+wireless LAN button 503" (step S102).

As a result of the determination in the step S102, when the communication device setting information indicates "the wired LAN+wireless LAN button 503", the CPU 201 carries out a line selection process in FIG. 10, to be described later (step S103). In the step S103, one of the main line and the sub line is selected as a line to be used. Then, the CPU 201 determines whether or not the line to be used is the sub line (step S104).

As a result of the determination in the step S104, when the line to be used is not the sub line, or as a result of the determination in the step S102, when the communication device setting information does not indicate "the wired LAN+wireless LAN button 503", the CPU 201 reads out the proxy usable/unusable information, which specifies whether or not to use the proxy server 15, from the HDD 204. The CPU 201 then determines whether the proxy usable/unusable information is "ON" or "OFF" (step S106).

As a result of the determination in the step S106, when the proxy usable/unusable information is "OFF", or as a result of the determination in the step S104, when the line to be used is the sub line, the CPU 201 carries out the HTTP communication directly with the external apparatus designated by the user (hereafter referred to as "the designated external apparatus") without using the proxy server 15. After that, the CPU 201 ends the present process.

As a result of the determination in the step S106, when the proxy usable/unusable information is "ON", the CPU 201 reads out the proxy address information from the HDD 204. Based on the read-out proxy address information, the CPU 201 then starts the HTTP communication with the proxy server 15. After that, the CPU 201 carries out the HTTP communication with the designated external apparatus via the proxy server 15 (step S108) and ends the present process.

Figure 10:
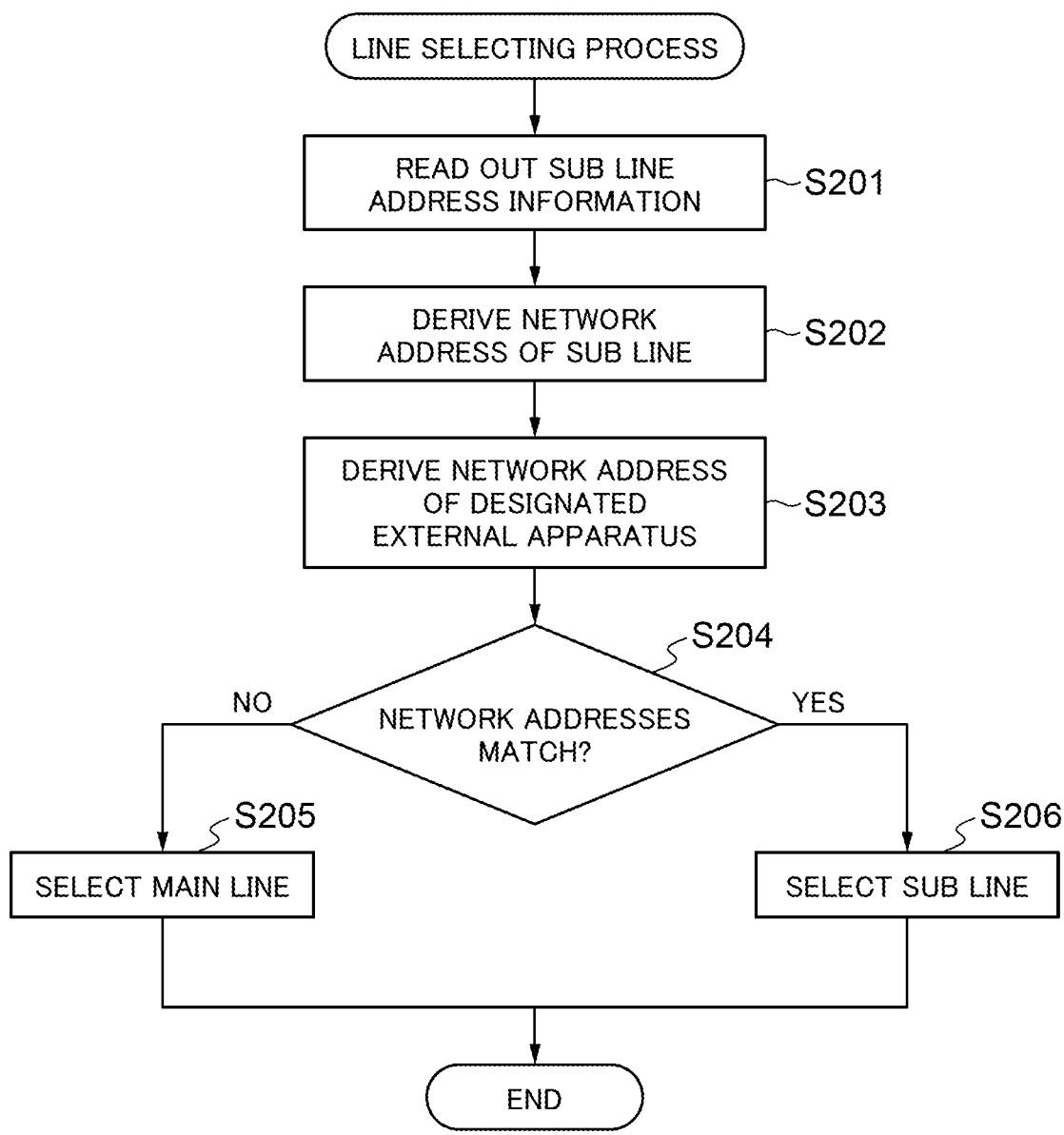
FIG. 10 is a flowchart showing the procedure of a line-to-be used determination process which is carried out in step S103 in FIG. 9.

FIG. 10 is a flowchart showing the procedure of the line selection process in the step S103 in FIG. 9.

Referring to FIG. 10, first, the CPU 201 reads out the sub line address information from the HDD 204 (step S201). Next, based on the read-out sub line address information, the CPU 201 derives a network address of the sub line (step S202). Specifically, the CPU 201 derives the network address of the sub line by performing a logical conjunction on the IP address and a subnet mask in the sub line address information. The CPU 201 then performs a logical conjunction on an IP address of the designated external apparatus and the subnet mask in the sub line address information to derive a network address of the designated external apparatus (step S203). After that, the CPU 201 determines whether or not the network address of the designated external apparatus and the network address of the sub line match each other (step S204).

As a result of the determination in the step S204, when the network address of the designated external apparatus and the network address of the sub line do not match each other, the CPU 201 selects the main line as the line to be used (step S205) and ends the present process.

As a result of the determination in the step S204, when the network address of the designated external apparatus and the network address of the sub line match each other, the CPU 201 selects the sub line as the line to be used (step S206) and ends the present process.

According to the processes in FIGS. 9 and 10 described above, when the sub line is the line to be used, a communication is carried out directly with the designated external apparatus without using the proxy server 15. Namely, the MFP 11 does not access the proxy server 15 on the main line when starting to communicate with the designated external apparatus on the sub line. This prevents an access error from occurring due to the absence of the proxy server 15 on the sub line and therefore avoids a situation in which a communication with the designated external apparatus becomes impossible due to settings on the proxy server 15.

Moreover, in the processes in FIGS. 9 and 10 described above, when the network address of the sub line and the network address of the designated external apparatus match each other, a communication is carried out directly with the designated external apparatus without using the proxy server 15. This reliably prevents an access error from occurring due to the absence of the proxy server 15 on the sub line.

Furthermore, in the processes in FIGS. 9 and 10 described above, when the line to be used is the sub line, a communication is carried out directly with the designated external apparatus without using the proxy server 15 irrespective of whether or not the proxy usable/unusable information is "ON" or "OFF". This reliably avoids a situation in which a communication with the designated external apparatus becomes impossible due to settings on the proxy setting screen 800.

In the processes in FIGS. 9 and 10 described above, communications are carried out using HTTP, and this reliably avoids a situation in which an HTTP communication with the designated external apparatus becomes impossible due to settings on the proxy server 15.

Moreover, in the processes in FIGS. 9 and 10 described above, the MFP 11 is an image forming apparatus that sends image data obtained by an image forming process such as a scanning process to the WebDAV servers 20 and 21. This avoids a situation in which the MFP 11 cannot send the image data to a desired one of the WebDAV servers 20 and 21 due to settings on the proxy server 15, causing processing to be delayed.

It should be noted that communications other than HTTP communications may be carried out insofar as the proxy server 15 is accessed at the start of communication with an external apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-212907, filed Nov. 2, 2017, which is hereby incorporated by reference herein in its entirety.

What is claimed is:

1. An information processing apparatus that sends data from a plurality of communication interfaces including at least a first communication interface and a second communication interface, comprising:
   at least one memory that store instructions; and
   at least one processor that executes the stored instructions to:
   set a proxy server used when communicating with an external apparatus on an Internet;
   determine a communication interface to be used in a communication from among the plurality of communication interfaces; and
   perform a control in which, in a communication performed by the first communication interface which is determined to be used in the communication, the data is sent outside via the set proxy server and, in a communication performed by the second communication interface which is determined to be used in the communication, the data is sent outside without passing through the set proxy server,
   wherein the information processing apparatus, while performing a communication with a first external apparatus via the first communication interface, is capable of performing a communication with a second external apparatus different from the first external apparatus via the second communication interface.

2. The information processing apparatus according to claim 1, wherein upon condition that a network address of the second interface and a network address of an external device specified as communication destination match each other, the second communication interface is determined to be used in the communication.

3. The information processing apparatus according to claim 1, wherein the stored instructions further comprise instructions to:
   set whether to enable the communication via the set proxy server,
   wherein in a case where the communication via the set proxy server is set to be disabled and the first communication interface is determined to be used in the communication, the data is sent outside without passing through the set proxy server.

4. The information processing apparatus according to claim 1, further comprising a scanner device,
   wherein the stored instructions further comprise instructions to:
   receive designation of a communication destination based on a user operation,
   wherein in a case where the communication destination is a WebDAV server and the first communication interface is determined to be used in the communication, in accordance with the received designation, an image data obtained by scanning a document by using a scanner device is sent to the WebDAV server via the set proxy server.

5. The information processing apparatus according to claim 1, wherein the stored instructions further comprise instructions to:
   in a case where use of the first communication interface is set to be disabled, use of the second communication interface is set to be enabled, and the second communication interface is determined to be used in the communication, perform a control in which the data is sent outside via the set proxy server.

6. The information processing apparatus according to claim 1, wherein the first communication interface is a communication interface that performs a communication with the first external apparatus on a main network, and the second communication interface is a communication interface that performs a communication with the second external apparatus on a sub network.

7. The information processing apparatus according to claim 6, wherein the first communication interface is a wired communication interface, and the second communication interface is a wireless communication interface.

8. A control method for an information processing apparatus that sends data from a plurality of communication interfaces including at least a first communication interface and a second communication interface, the control method comprising:
   setting a proxy server used when communicating with an external apparatus on an Internet;
   determining a communication interface to be used in a communication from among the plurality of communication interfaces; and
   performing a control in which, in a communication performed by the first communication interface which is determined to be used in the communication, the data is sent outside via the set proxy server and, in a communication performed by the second communication interface which is determined to be used in the communication, the data is sent outside without passing through the set proxy server,
   wherein the information processing apparatus, while performing a communication with a first external apparatus via the first communication interface, is capable of performing a communication with a second external apparatus different from the first external apparatus via the second communication interface.

9. A non-transitory computer-readable storage medium storing a program for causing a computer to execute a control method for an information processing apparatus that sends data from a plurality of communication interfaces including at least a first communication interface and a second communication interface, the control method for the information processing apparatus comprising:
   setting a proxy server used when communicating with an external apparatus on an Internet;
   a determination step of determining a communication interface to be used in a communication from among the plurality of communication interfaces; and
   a control step of performing a control in which, in a communication performed by the first communication interface which is determined to be used in the communication, the data is sent outside via the set proxy server and, in a communication performed by the second communication interface which is determined to be used in the communication, the data is sent outside without passing through the set proxy server,
   wherein the information processing apparatus, while performing a communication with a first external apparatus via the first communication interface, is capable of performing a communication with a second external apparatus different from the first external apparatus via the second communication interface.

* * * * *